May 5, 1925.
W. E. FOCKE
1,536,782
METHOD OF TRIMMING HEADS AND APPARATUS THEREFOR
Filed July 12, 1924 3 Sheets-Sheet 1
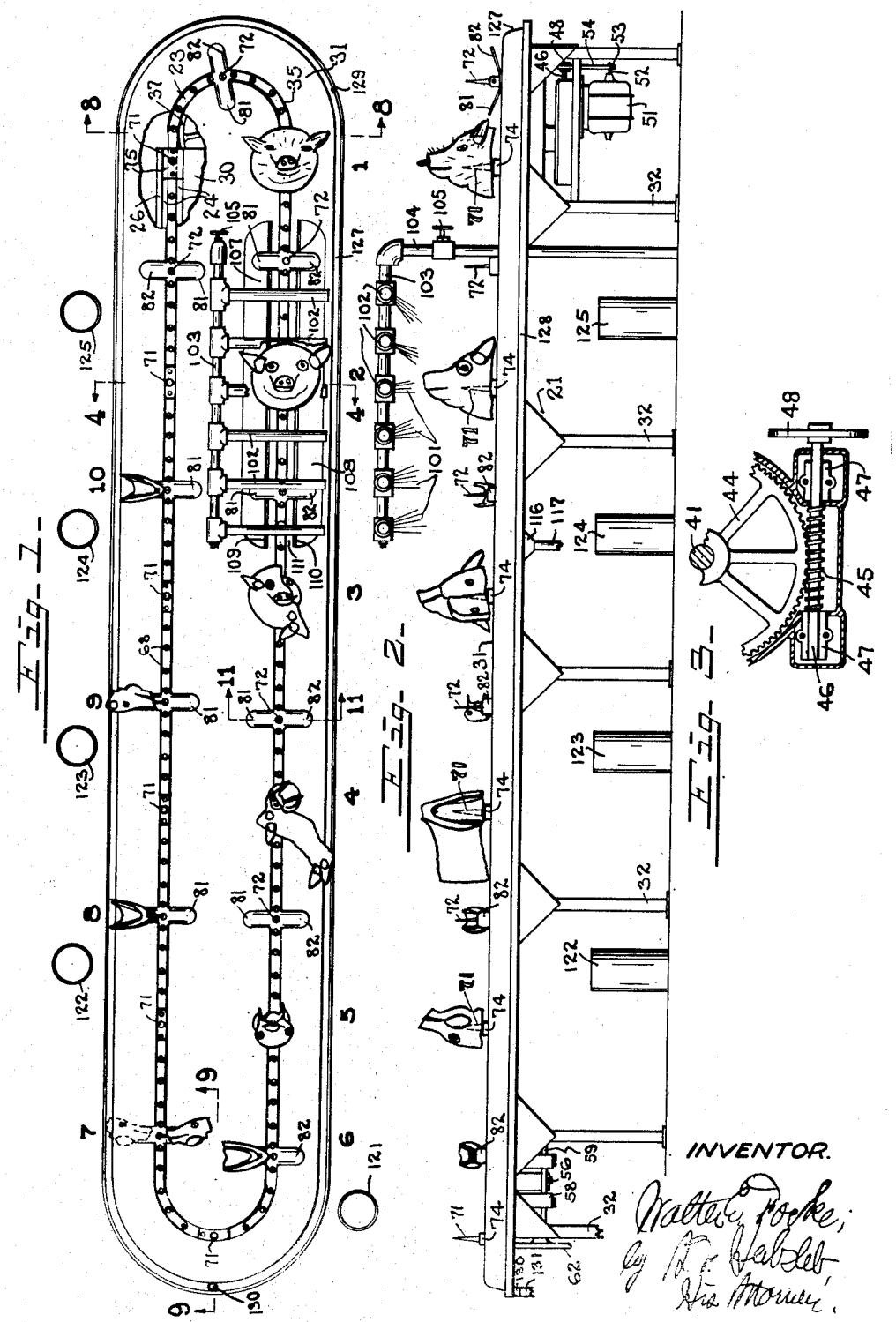
INVENTOR.

May 5, 1925.
W. E. FOCKE
1,536,782
METHOD OF TRIMMING HEADS AND APPARATUS THEREFOR
Filed July 12, 1924    3 Sheets-Sheet 2
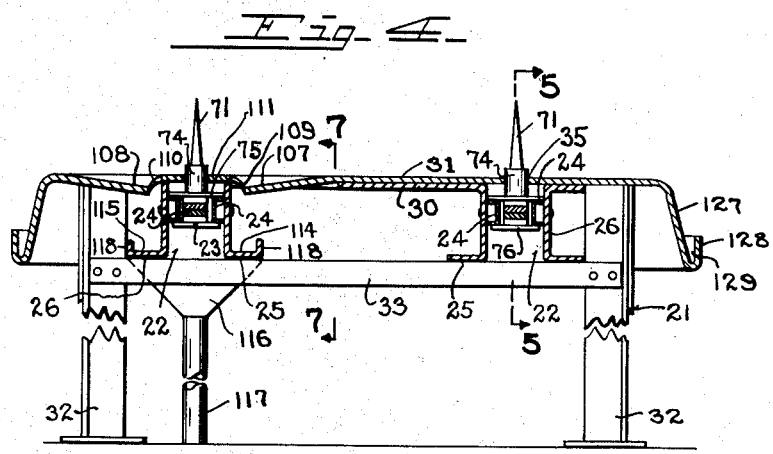
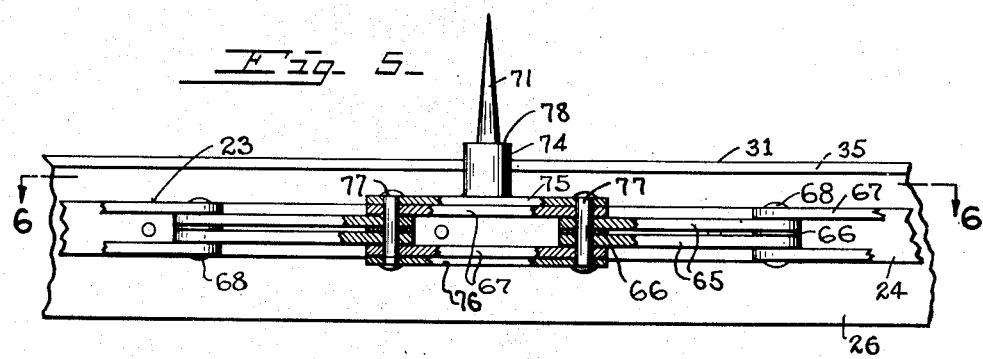
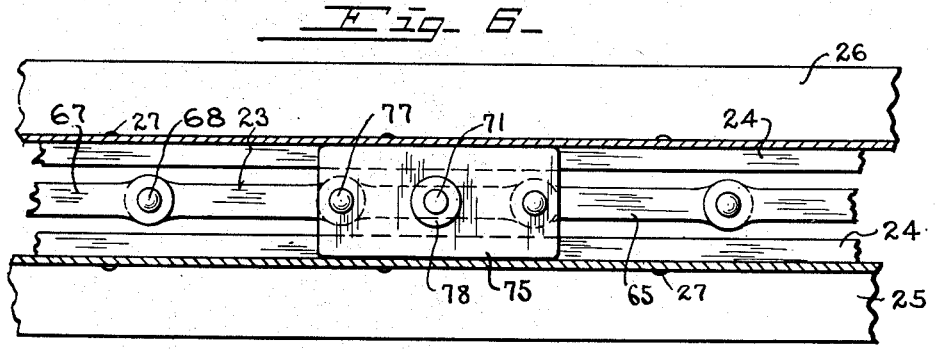
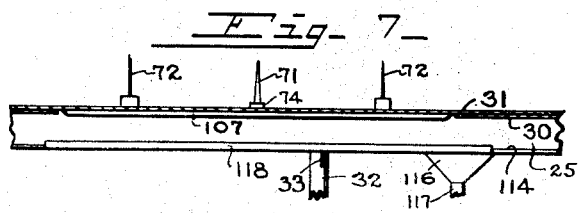
INVENTOR.

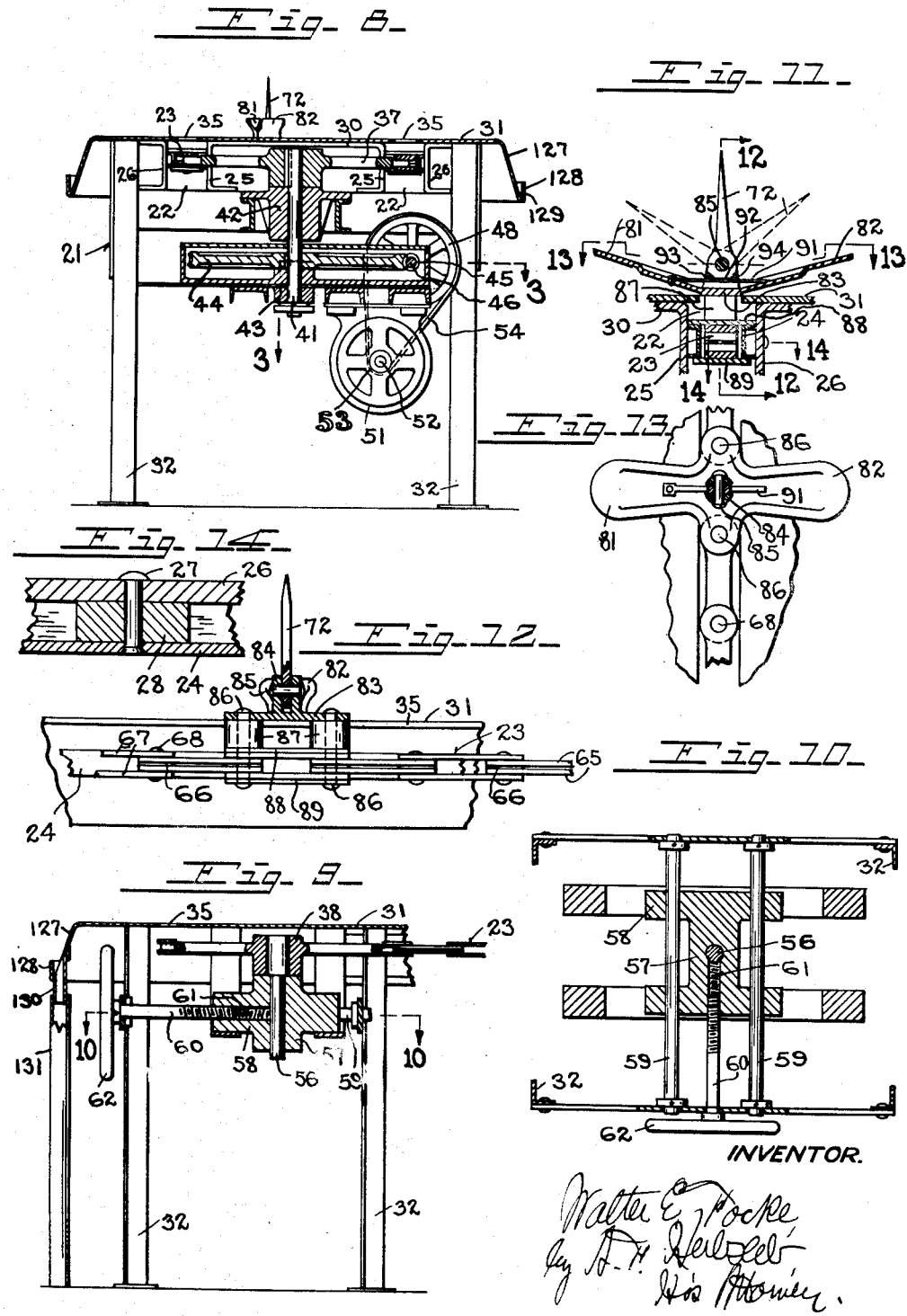

Patented May 5, 1925.

1,536,782

UNITED STATES PATENT OFFICE.

WALTER E. FOCKE, OF DAYTON, OHIO, ASSIGNOR TO THE CINCINNATI BUTCHERS' SUPPLY COMPANY, OF CINCINNATI, OHIO, A CORPORATION OF OHIO.

METHOD OF TRIMMING HEADS AND APPARATUS THEREFOR.

Application filed July 12, 1924. Serial No. 725,615.

*To all whom it may concern:*

Be it known that I, WALTER E. FOCKE, a citizen of the United States, residing at Dayton, in the county of Montgomery and State of Ohio, have invented certain new and useful Improvements in Methods of Trimming Heads and Apparatus Therefor, of which the following is a specification.

It is the object of my invention to provide new and improved head trimming method and means which will improve the sanitary conditions under which the head is trimmed and expedite the trimming and enhance the grading of the meat.

My improved method and apparatus is principally adaptable for trimming the heads of the carcasses of hogs, and will be explained in connection with such use, although it is applicable for the heads of other carcasses.

In slaughtering hogs it is usual to stick and to bleed the same, place the carcasses in a scalding tub, and after being properly scalded the carcasses are dehaired in a suitable dehairing machine, after which they are placed on a gambreling table, and the heads cut from the bodies either on the gambreling table or after the carcasses have been suspended from a suitable traveling conveyor, it having been the usual practice heretofore to place the severed heads in a cooling tank containing cool water.

The outer surfaces of these severed heads have scurf and unremoved hair thereon, bristles being included in the designation hair, some of the scurf and loose hair under this practice being washed from the outer surfaces of the head and contacting the cut portions of the same, thereby contaminating the meat. It is the object of my invention to avoid contamination of the meat, and to transfer the heads directly from the pans or containers in or on which they are located during inspection by a Government inspector to a traveling conveyor on which the operations of trimming the heads are performed.

It has been a practice heretofore in trimming the heads to place the heads on a stationary table, the butcher who trims the head holding the head with one hand and cutting the meat of the head with his knife in the other hand, the butcher being obliged to lift and turn the uncontrolled head by physical force to reach the various parts of the head from which meat is to be trimmed.

It is the object of my invention, further, to avoid the necessity of manipulating the head solely by physical force, and to provide means for supporting the head in various positions and so that the positions of the head may be readily and easily changed for ready manipulation of the head, in order to present its various parts in convenient positions for being trimmed by the operator.

It is the object of my invention, further, to hold the head from its inside and to move the same from one trimming station to another and to trim various portions therefrom at the respective stations while the head is so held and manipulated.

It is the object of my invention, further, to provide novel means whereby the head is transferred from station to station at which various operations of trimming are performed; further, to provide means for supporting the head at the various stations in convenient positions for the particular operations at the several stations; further, to provide novel means for flushing the head during travel of the same while the head is so positioned that the flushed material will drip from the head without contamination of the cut meat portions thereof; further, to provide novel holding means for the head whereby the head may be held in upright positions and rotated about an upright axis; further, to provide novel means whereby the heads so held may also be inclined and rotated in inclined positions.

The invention will be further readily understood from the following description and claims, and from the drawings, in which latter:

Fig. 1 is a plan view of an exemplifying apparatus illustrating my invention, partly broken away.

Fig. 2 is a side elevation of the same.

Fig. 3 is a detail of driving mechanism, shown in section in the plane of the line 3—3 of Fig. 8.

Fig. 4 is a cross-section of my improved apparatus, taken on the line 4—4 of Fig. 1.

Fig. 5 is a longitudinal section of a detail of the same, taken in the plane of the line 5—5 of Fig. 4.

Fig. 6 is a plan section of the same, taken in the plane of the line 6—6 of Fig. 5.

Fig. 7 is a vertical section of the same, taken in the plane of the line 7—7 of Fig. 4.

Fig. 8 is a cross-section of my improved device, taken on the line 8—8 of Fig. 1, and exemplifying the driving means.

Fig. 9 is a vertical section, taken on the line 9—9 of Fig. 1, showing the take-up means for the sprocket chain.

Fig. 10 is a horizontal section of the same, taken in the plane of the line 10—10 of Fig. 9.

Fig. 11 is a vertical section of a detail of the pivoted peg, taken on the line 11—11 of Fig. 1.

Fig. 12 is a vertical section of the same, taken in the plane of the line 12—12 of Fig. 11.

Fig. 13 is a horizontal section of the same, taken in the plane of the line 13—13 of Fig. 11; and, Fig. 14 is a detail in section of the guideway for the flexible conveyor, taken in the plane of the line 14—14 of Fig. 11.

In the present exemplification of apparatus employed, a frame 21 is exemplified as comprising guideways 22, in which a flexible conveyor 23, exemplified as a sprocket chain, is arranged to travel, the guideways being exemplified as comprising channel-bars 24 at the respective sides of the guideway, having their bases presented toward each other, these channel-bars being fixed to larger channel-bars 25, 26, whose bases are presented toward each other, as by means of rivets 27 passing through said channel-bars and blocks 28 located in the channels of the channel-bars 24.

The apparatus may be arranged in suitable directions. It is shown straight in Fig. 1, but may correspond in its form or relation to the space which it is to occupy. It may be of L-form, T-form, or other form desired.

The inner channels 25 are connected by a web 30 for strengthening the structure. The channel-bars 25 and 26 are fixed to a suitable top 31, arranged to form a table, and the outer channel-bars 26 and the outer portion of the table are arranged to be secured to suitable legs 32 which have suitable cross-braces 33 between them, the legs and channel-bars 25 and 26 being suitably secured to the cross-braces for forming a rigid structure.

The top has a slot 35 therein to coincide with the path of the flexible conveyor. The flexible conveyor is shown as arranged loopwise about sprocket-wheels 37, 38, at the respective ends of the loop, the sprocket chain having parallel stretches between the sprocket wheels. The sprocket wheel 37 is fixed to a shaft 41 journaled in bearings 42, 43, of the frame, the shaft having a worm-wheel 44 fixed thereto. A worm 45 meshes with the worm-wheel and is located on a shaft 46 journaled in bearings 47 of the frame, said shaft having a pulley 48 fixed thereto. An electric motor 51 is secured to the frame, the drive-shaft 52 thereof having a pulley 53 fixed thereto. The pulleys 48 and 53 are arranged to receive a silent chain 54 or other belt thereabout for driving the flexible conveyor.

An idler sprocket wheel 38 is at the other end of the loop. It is fixed to a shaft 56 journaled in a bearing 57 on a slide 58, slidable on rods 59 fixed to the main frame, and adjusted by means of a screw-rod 60 threaded in a threaded bore 61 of said slide and having a hand-wheel 62 fixed thereto for adjusting the same.

The sprocket chain is exemplified as comprising inner links 65 separated by washers 66, and outer links 67, rivet-pins 68 connecting the ends of the respective links, and forming articulations therefor.

The flexible conveyor is arranged to propel suitable holders for the heads to be trimmed, shown as the heads of hogs, these holders being exemplified as spikes or pegs received inside the heads. Pegs 71 are shown fixedly positioned with relation to the flexible conveyor, and pegs 72 are shown adjustably positioned with relation to the flexible conveyor.

The pegs 71 are provided with bases 74 on plates 75, arranged to travel with the flexible conveyor, means being provided to maintain the pegs in their desired paths of travel. Thus the plates 75 ride on the channel-bars 24, and plates 76 ride under said channel-bars. The plates 75 and 76 have the links of the sprocket chain between them, and are articulated with said links to the chain by means of rivet-pins 77, the plates being received respectively above and below the channel-bars 24 for being guided by said channel-bars and thereby holding the pegs in their paths of travel. The head impaled on the peg 71 is supported by the shoulder 78 of the base, to position the head so that its lower end is raised above the table.

These channel-bars are exemplified as coextensive with the straight portions of the slots 35 in the table, the operations upon the heads preferably taking place during travel of the heads lengthwise of these straight portions, although if desired the channel-bars may be continued concentric with the axis of the sprocket-wheels at the respective ends of the loop of the sprocket chain, whereby operators' stations, as hereinafter described, may also be located at the curved portions of said slots.

The shiftable head-holders shown in the form of the pegs 72, permit the head being trimmed to be placed at an inclination.

Shelves 81, 82, may also be provided for receiving the heads being trimmed. The shiftable holders and the shelves are preferably associated, as by providing a base 83, shown as a plate, from which the shelves or wings 81, 82, extend laterally at the respective sides of the slot 35, the base being provided with pivot lugs 84 between which the pivot end of the shiftable peg is arranged to be received, the pivot-pin 85 being received through holes in said lugs and peg. Pivot-pins 86 of the sprocket chain are received through the base 83, spacing collars 87, guide-plates 88, 89, respectively above and below the channel-bars 24, and the respective ends of the sprocket links, for connecting said base and the sprocket chain, and holding the base to the guide plates of the sprocket chain, so as to maintain the shelves in a preferably fixed path of travel, and prevent tilting thereof by the weight of the head and manipulations thereon.

The shiftable peg is arranged to be shifted into various positions for holding the head upright, in which position it is shown in full lines in Fig. 11, or for inclining the head on to either of the shelves, in which relations the peg is shown in dotted line with Fig. 11. The peg is maintained in adjusted positions, as by means of a spring 91 shown as a flat spring fixed to one of the shelves and resiliently contacting the end faces 92, 93, 94, on the base of said shiftable peg, for holding the peg in its respective positions.

Suitable operators' stations are arranged about the table, exemplified as ten in number, although the number of stations may be varied, the stations being numbered 1 to 10 inclusive, respectively.

The head is, as before explained, received after inspection by the Government inspector and without first immersing the head in a bath, as hereinbefore explained, at the operator's station 1, and is placed by the operator on the head holder at such station, as by impaling the neck end of the head on the peg thereof, so that the mouth end of the head extends upwardly, as illustrated in Figs. 1 and 2. The operator at this position also removes the nose-ring. The head as so placed at this station 1, usually still has scurf, loose hair and unremoved hair thereon, as indicated in said figure, it being the intention to dispense with the usual shaving of the head while the carcass is on the gambreling table or suspended from the conveyor, and to perform this shaving of the head on my improved device, on which the head is more conveniently placed for being shaved. The flexible conveyor automatically travels during performance of the operations by the operator at station 1 toward station 2.

The operator at station 2 scrapes off the scurf and loose hair and cleanly shaves the head, by means of suitable scraping and shaving knives in scraping and shaving operations. These scraping and shaving operations are aided by the fact that the head, being supported from below at its neck end, the end of the head resting on the shoulder 78, causes stretching of the skin of the head so as to smooth the wrinkles in the outer surface of the head, thereby stretching the skin and making the scraping and shaving easy, the head being positioned and turned by the operator for most convenient operation thereon. The scurf and hair removed drop from the head. The cut portions of the meat at the neck-end of the head, being located at the under side of the head, are guarded from this scurf and hair, it being understood further that the shoulder 78 is elevated above the plane of the table so as to maintain the under side of the head free from contact with the table. The operations are quickly performed due to the convenient positioning and manipulation of the head.

In order to aid the ready removal of the scurf and hair, suitable sprays, exemplified at 101, for instance of cold water, may be directed in various directions upon the head, so as to readily flush the head, and cause quick removal of the scurf and hair. These sprays may be obtained by means of suitable perforations in spraying pipes 102, extending crosswise of the path of the sprocket chain, and connected by a suitable header-pipe 103, with which a feed-pipe 104 connects from a suitable source of supply, the feed-pipe having a valve 105 therein, in suitable location for operation by the operator at station 2. These pipes may be arranged for a suitable distance lengthwise of the path of travel of the head, so that when the scraping and shaving operation is completed by the operator at station 2, the head may be subjected to further spraying in its passage to station 3.

In order to provide ready escape of the sprayed water and the scurf and hair removed thereby, the table is preferably provided with depressions 107, 108, the upper ends of the channel-bars 25, 26, and the web 30, being partially cut away for permitting such depression. This depression is located at station 2 and preferably extends substantially to station 3. The table is at such depressions provided with openings 109, 110, through which the fluid and offal pass. The portion 111 of the table above the space between the channel-bars 25 and 26 at said stations protects the sprocket chain from said fluid and offal.

Gutters 114, 115, may be provided under the openings 109, 110, for catching the water and offal, these gutters being shown emptying into a suitable funnel 116 of a drain-pipe 117. The gutters may be formed by the lower portions of the channel-bars 25, 26, to which walls 118 have been attached.

The ear-drums and eye-lids are also cut away by the operator at station 2 to prepare the head for removal of the more valuable meat portions.

The head automatically passes to station 3, at which station the operator, having turned the head to present its skull toward him, makes an incision from the top of the snout throughout the back of the head, to the bone, and cuts toward the left along the bone under the gristle of the snout and past the left sides of the upper and lower lips and under the left eye and left ear, and under the left jowl, about one-fourth way around the head, as indicated at station 3 in Figs. 1 and 2. The head during such operation is automatically traveling toward station 4.

The operator at station 4 continues the cutting along the bone, cutting under the major portion of the jowls, and cutting under the outer meat for about three-fourths of the distance around the head, rotating the head as the cutting proceeds, the travel of the head continuing during this operation to station 5.

The operator at station 5 completes the cutting away of the outer portion of the meat, including the balance of the right jowl, so as to meet the first incision, cutting under the right sides of the lips, the right eye and the right ear and removing the outer meat portion from the balance of the head, the entire meat portion cut away being removed from the head at station 5 to a suitable trimming table or movable conveyor for further operations.

Throughout these operations the outer meat portions are maintained raised above the table, the loosened end being passed from one operator to the next, or supported on the skeleton of the head between operations.

During these operations upon the head, the head is, in the present exemplification, attached to the relatively fixed peg.

The operator at station 6 reverses the position of the head, by placing the head upon the head holder with its nostrils presented downwardly. The head is also preferably transferred from a relatively stationary holder to a relatively shiftable holder, being shifted from the relatively stationary peg 71 to a pivoted peg 72, with one of its nostrils received about the peg.

The head while on the shiftable peg is arranged to be rotated about the axis of said peg, and to be held in upright position or to be inclined so as to rest on either of the shelves.

The operator at station 6 lays the head with its forehead presented downwardly upon the rear shelf 81, and, in such position, cuts away the tongue, which he removes from the head, the tongue being removed through the lower jaw. The head during such manipulation automatically travels along station 6 and automatically moves toward station 7.

The operator at station 7 places the head in reclining position, for instance rearwardly away from the operator, upon the shelf 81, as indicated in full lines, with the left side of the head presented upwardly, the operator removing the cheek-meat from the left side of the head, whereupon the head is swung on the pivot of its peg toward the operator, so as to rest on the shelf 82, as indicated in dotted lines, whereupon the operator at station 7 removes the cheek meat from the right side of the head. If desired, the operator may rotate the head upon the peg for presenting respectively the left side and the right side for cutting away the cheek meat at the sides.

The head next automatically travels to station 8, at which station the operator swings the head so as to lie upon the shelf 82, toward the operator, in which position the operator cuts away the balance of the meat around the base of the tongue and whatever meat may be left at the back of the head, at the inside of the skull, and at the neck and body joints, the operator rotating the head upon the pin for ready access to the various head parts.

During such operation the head is automatically traveling toward station 9.

The operator at station 9 cuts away the temple meat from the head at the right side and left side of the head, rotating the head on its peg and swinging the head and peg into various positions upon either shelf for ready access to the temple meat which he is cutting away.

The head automatically passes along station 9 toward station 10.

The operator at station 10 swings the head to recline on the outer shelf 82, and cuts away the meat from the jaw at the inside of the head between the cheek-bone and the jaw, and such other meat as may be still adhering to the bone of the head, the operator manipulating the head by rotating and swinging the same to either shelf for convenience of access to the meat, and when such operation is completed, removes the head, or what is left of it, from the peg to a suitable conveyor or platform or table, for further operation upon the bone of the head, as for splitting the skull or other purposes.

Holders may be provided in addition to those described in service at said stations, so that additional stations may be located if desired, and so that an empty holder may always be assured at station 1.

The parts removed at stations 1 and 3 are suitably disposed of.

The meat removed at the various stations 6 to 10 inclusive may be placed in suitable containers or suitable trucks or in suitable chutes, from which it is conveyed to suitable storage or other points. I have exemplified the chutes at 121, 122, 123, 124, 125.

The table may be provided with a suitable apron 127 thereabout, having a reversely bent portion 128, for forming a gutter 129, in which the liquid from the operations and drippings may be received for protecting the operators, and along which it may flow to a suitable drain opening 130, connecting with a drain-pipe 131, for draining the gutter.

My invention provides economical and simple method and means by which the heads may be conveniently held for easy manipulation and readily trimmed in sanitary manner, and by which contamination of head portions may be readily avoided. The operator is by my invention relieved from the major portion of the physical exertion of arranging the head for cutting of the same, great saving in time and in excellence of product being obtained over the means and methods heretofore employed for trimming heads.

By employment of my invention the meats from the various parts of the head are segregated and maintained segregated, whereby the meats obtained from the head receive a higher grading and are more valuable.

Having thus fully described my invention, what I claim as new, and desire to secure by Letters Patent, is:

1. The method of trimming meat from heads which consists in causing movement of the head, while the head is held from its inside, past trimming stations at which various meat trimming operations are performed and having the holding means for the head so mounted as to permit rotation and tilting of the head.

2. The method of trimming meat from heads which consists in causing movement of the heads, while the heads are held from their inside, successively past trimming stations at which respectively similar meat trimming operations are performed, the meat trimming operations at different stations being different, so as to collect selective meat portions from the heads at various trimming stations.

3. The method of trimming heads which consists in holding the heads and moving the heads while so held from one trimming station to another for trimming operations at a number of such trimming stations at which different meat trimming operations upon the heads are performed, similar meat trimming operations being performed on the heads at the respective trimming stations.

4. A head trimming apparatus comprising a conveyor, head holders conveyed thereby, and means whereby said head holders are arranged to be placed in reclining position with relation to said conveyor.

5. A head trimming apparatus comprising a conveyor, head holders conveyed thereby, means whereby said head holders are arranged to be placed in reclining position with relation to said conveyor, and means to retain said head holders in positions in which they have been placed.

6. A head trimming apparatus comprising traveling head holders fixed with relation to the line of travel, and head holders and means therefor whereby to shift said last-named head holders with relation to their line of travel.

7. A head trimming apparatus comprising traveling head holders, including head holders fixed with relation to their line of travel and head holders shiftable with relation to their line of travel, said fixed head holders and shiftable head holders alternately positioned in said line of travel.

8. In a head trimming apparatus, the combination of a traveling chain, operators' stations arranged along said chain, and pegs extending upwardly from said traveling chain and traveling therewith and arranged to have the heads of hogs placed thereabout, and arranged whereby said heads are shiftable about the axis of said respective pegs.

9. In a head trimming apparatus, the combination of a traveling chain, operators' stations arranged along said chain, pegs extending upwardly from said traveling chain and traveling therewith and arranged to have the heads of hogs placed thereabout, and arranged whereby said heads are shiftable about the axis of said respective pegs, and means whereby said pegs are placed in reclining positions.

10. A head trimming apparatus comprising traveling head holders, a flexible endless conveyor, operators' stations arranged along said endless conveyor, and operative connecting means between said flexible endless conveyor and said head holders for conveying said head holders past said operators' stations and at which succeeding trimming operations are performed upon heads held by said head holders.

11. A head trimming apparatus comprising a stationary table provided with a slot, a flexible conveyor under said table, head holders extending through said slot above said table, and operators' trimming stations arranged lengthwise of said slot, said flexible conveyor having operative connections with said head holders for causing travel of said head holders lengthwise of said slot past said operators' trimming stations at which successive trimming operations upon heads held by said head holders are performed.

12. In a head trimming apparatus, the combination of a stationary table provided with a slot, a flexible conveyor under said table, head holders extending through said slot above said table, operators' trimming stations arranged lengthwise of said slot, said flexible conveyor having operative connection with said head holders for causing travel of said head holders lengthwise of said slot past said operators' trimming stations at which successive trimming operations upon heads held by said head holders are performed, and means above said table for spraying heads held by said head holders.

13. In a head trimming apparatus, the combination of a stationary table provided with a slot, a flexible conveyor under said table, head holders extending through said slot above said table, operators' trimming stations arranged lengthwise of said slot, said flexible conveyor having operative connection with said head holders for causing travel of said head holders lengthwise of said slot past said operators' trimming stations at which successive trimming operations upon heads held by said head holders are performed, and means above said table for spraying heads held by said head holders, said table provided with a depression below said last-named means for receiving the sprayed liquid and offal.

14. In a head trimming apparatus, the combination of a flexible conveyor, a head holder conveyed thereby comprising a base and a head holding peg, and guiding means for said base, said head holder provided with a shoulder to limit descent of the head upon said peg.

15. In a head trimming apparatus, the combination of a flexible conveyor, a head holder conveyed thereby comprising a base and a head holding peg, guiding means for said base, and means to shiftingly support said peg on said base.

16. In a head trimming apparatus, the combination of a flexible conveyor, a head holder conveyed thereby comprising a base and a head holding peg, guiding means for said base, and means including a pivot and a spring to shiftingly support said peg on said base and maintain said peg in shifted position.

In testimony whereof, I have hereunto signed my name in the presence of two subscribing witnesses.

WALTER E. FOCKE.

Witnesses:
JOSEPH LEMKUHL,
DELMA WERNSING.